(12) United States Patent
Feyisetan

(10) Patent No.: US 11,734,512 B1
(45) Date of Patent: Aug. 22, 2023

(54) INFORMATION UNIQUENESS DETERMINATION FOR NATURAL LANGUAGE DATA

(71) Applicant: Amazon Technologies, Inc., Seattle, WA (US)

(72) Inventor: Oluwaseyi Oluwafemi Feyisetan, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 476 days.

(21) Appl. No.: 16/899,917

(22) Filed: Jun. 12, 2020

(51) Int. Cl.
  *G06F 40/279* (2020.01)
  *G06F 40/289* (2020.01)
(52) U.S. Cl.
  CPC .......... *G06F 40/289* (2020.01); *G06F 40/279* (2020.01)
(58) Field of Classification Search
  CPC .......................... G06F 40/289; G06F 40/279
  USPC .......................................................... 704/9
  See application file for complete search history.

(56) References Cited

U.S. PATENT DOCUMENTS 11,023,953 B1 * 6/2021 Furlan ................ G06Q 30/0203

OTHER PUBLICATIONS

Sadat et al.; A Privacy-preserving Distributed Filtering Framework for NLP Artifacts; BMC Medical Informatics and Decision Making; Sep. 7, 2019; 10 pgs.

* cited by examiner

*Primary Examiner* — Thierry L Pham
(74) *Attorney, Agent, or Firm* — K&L Gates LLP

(57) ABSTRACT

Devices and techniques are generally described for determining an information content score for a natural language input. In various examples, data representing a natural language input may be received. A first probability of the natural language input may be determined by comparing words of the natural language input to a first data structure representing a plurality of natural language phrases. A score for the natural language input may be determined based at least in part on the first probability. In some examples, the score may represent an amount of information content included in the natural language input. In various examples, the natural language input may be sent to a remote computing device based at least in part on the score.

20 Claims, 8 Drawing Sheets

INFORMATION UNIQUENESS DETERMINATION FOR NATURAL LANGUAGE DATA

BACKGROUND

Automatic speech recognition (ASR) combined with language processing techniques may enable a computing device to retrieve and process commands from a user based on the user's spoken commands. Natural language processing can be used to translate spoken and/or text requests into semantic interpretations of the input request. Executable instructions are generated based on the semantic interpretation of the spoken command. The executable instructions are executed and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
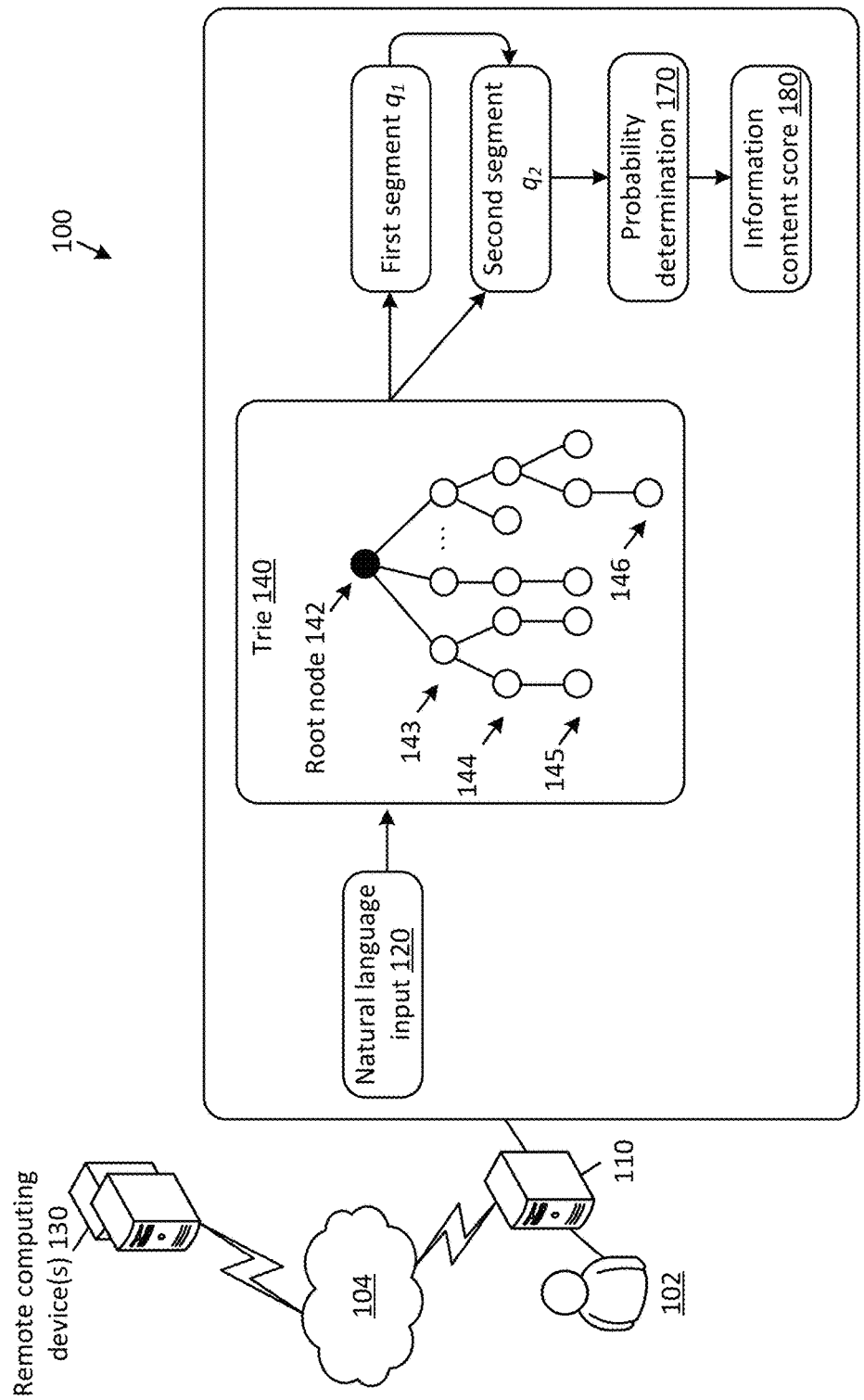
FIG. 1 is a diagram of a system configured to determine an information content score for a given natural language input, according to various embodiments of the present disclosure

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Spoken language understanding (SLU) is a field of computer science, artificial intelligence, and/or linguistics that receives spoken language as an input, interprets the input, and generates executable commands that may be executed by one or more other computing devices and/or speech processing components. SLU may include automatic speech recognition (ASR) and natural language understanding (NLU). ASR is a field of computer science, artificial intelligence, and linguistics concerned with transforming audio data associated with speech into text data and/or other ASR output data representative of that speech. NLU is a field of computer science, artificial intelligence, and linguistics concerned with enabling computers to derive meaning from text input containing natural language, resulting in specific semantic intent data representing a semantic interpretation of the text. The semantic intent data associated with a natural language input may include executable commands or other type of instructions that may be used to generate various types of output. For example, the semantic intent data may be processed to answer a question represented by the natural language input, take an action requested by the natural language input, answer a question represented by the natural language input, etc. An example speech processing architecture is described in further detail below in reference to FIG. 7.

In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include Text-to-speech (TTS) where a machine learning model may receive input audio data (e.g., request data representing user request data and/or user text input data) and may generate output audio data in response to the utterance. TTS is a field of computer science, artificial intelligence, and linguistics concerned with enabling computers to output synthesized speech. ASR, NLU, and TTS may be used together as part of a natural language processing system. In some examples, other types of input apart from spoken utterances may be received by a natural language processing system. For example, text, visual input (e.g., facial recognition and/or hand recognition), haptic input, and/or other types of input may be received and/or processed by a natural language processing system.

As used herein, user utterances, input text data, and/or any form of data input to a natural language processing system may be described as "natural language inputs" and/or "natural language input data." Data representing natural language inputs may change forms many times during processing of the request data by various components of the speech processing system. For example, initially the request data may be audio data and/or input text data representing a user question or other user input. The audio data may be transformed into text data and/or other ASR output data by an ASR component of the speech processing system. The text data and/or other ASR output data may be transformed into intent data and/or other type of meaning representation NLU output data by an NLU component of the speech processing system. The NLU output data may be used by a speech processing application (e.g., a skill) to perform an action (e.g., to generate action data and/or other skill output that may be processed in order to take some corresponding action such as answering a user's question, playing video, playing audio, etc.).

Various SLU techniques utilize machine learning models during speech processing. In many cases, such machine learning models are trained using datasets of natural language inputs.

In an example, text data and/or audio data representing questions and/or commands (e.g., natural language inputs) that may be processed using SLU may be sent to human annotators that may label the natural language inputs with one or more class labels. Such labels are annotations used by some machine learning models to "learn" to make better decisions and/or choices. Accordingly, described herein are techniques that may be used to determine the information content of a particular natural language input in terms of the ability to infer that the particular natural language input belongs to a particular class.

In various examples, levels of information content included in a particular natural language input may be used to identify sensitive data and/or to enhance user privacy. For example, it may be determined that a particular natural language input has a high information content score. A high information content score may indicate that there is a significant probability that user-identifiable (e.g., class membership) information (and/or other type of potentially sensitive information) may be inferred from such a natural language input. Accordingly, various controls actions may be taken in response to determining that the particular natural language input has a high information content score. For example, safeguards may prevent the natural language input from being sent off-device to unauthenticated and/or untrusted devices and/or individuals. In some other examples, natural language input with high information content scores may be modified to reduce the identifiability and/or sensitivity of the natural language input. In various examples, the routing destination of natural language inputs with high information content scores may be limited to secure, authenticated, and/or trusted routing destinations.

Additionally or alternatively, using the various techniques described herein, the information content of a particular natural language input may be determined in real time upon receipt of a single natural language input. Accordingly, using the various techniques described herein, a decision can be made concerning routing, encryption, and/or further processing of the natural language input upon receipt.

FIG. 1 is a diagram of a system 100 configured to determine an information content score 180 for a given natural language input 120, according to various embodiments of the present disclosure. In various examples, a user 102 may communicate with a local device 110. Local device 110 may be a speech-processing enabled device and may be effective to continually "listen" for a wake word. Upon detection of a wake word, local device 110 may record and may perform ASR to determine text data representing a natural language input represented by the audio. In some examples, instead of receiving audio, local device 110 may receive other inputs such as text inputs and/or graphical user interface inputs (e.g., via a mouse, touchscreen, etc.). In any event, user 102 may input a natural language input 120 into local device 110. The natural language input 120 may be data including one or more words. In an example, the natural language input 120 may be audio data that is transformed into text data via ASR. In another example, the natural language input 120 may be text data comprising one or more words (sometimes referred to as "tokens").

In an example, local device 110 may be configured in communication with one or more remote computing device(s) 130 over a network 104. Network 104 may be a wide area network (WAN), such as the Internet, or may be a local area network (LAN). In various examples, the remote computing device(s) 130 may be configured to perform the various techniques described herein related to determination of information content scores 180 for a given natural language input 120. In other examples, local device 110 may be configured to perform the various techniques described herein related to determination of information content scores 180 for a given natural language input 120. In some examples, the information content score 180 for a particular natural language input 120 may be used to determine whether or not to send the natural language input 120 to one or more remote computing device(s) 130 for remote processing. In various examples, an information content score 180 for a particular natural language input 120 may represent a uniqueness of the natural language input. Typically, the more unique a natural language input 120 is, the more information may be determined about the source of the natural language input 120. Conversely, natural language inputs that are generic across a plurality of different users contain relatively little information about any particular source. The information content score 180 is a value that quantitatively reflects the amount of information and/or the uniqueness of a particular natural language input.

Conceptually, information content score 180 may be used as a metric to represent the identifiability and/or level of information gained by the observation of an event (e.g., the natural language input 120). In some example embodiments, the probability of a particular natural language input 120 may be used to determine the information content score 180. A natural language input with probability 100% may be considered commonplace and completely generic. Accordingly, such a natural language input may yield no personally identifiable information. Conversely, the less probable a natural language input is, the more unique and potentially identifiable it is and the more information it may yield about the user. Another property of the information content score 180 that may be desirable is that the information gained from independent queries (e.g., independent natural language inputs) may compose additively.

The information content score 180 may be abbreviated as ICS. Similarly, a given natural language input comprising one or more words may be represented by q. The natural language input q may occur with the probability P. Accordingly, in an example, the information content score 180 may include one or more of the following properties:

1. ICS(P(q)) may be monotonically decreasing with respect to P(q). In other words, the more probable the natural language input, the smaller the information content score.

2. ICS(P(q))≥0. In other words, the information content score 180 may assume a value greater than or equal to zero.

3. ICS(P(q)=)=0 is defined for a natural language input that does not yield any information since it occurs with 100% probability.

4. ICS: P(q)→[0,1]. In other words, the information content score 180 may be bounded between 0 and 1 (as opposed to between 0 and ∞).

5. The information content score may be related to metrics of plausible deniability (e.g., Nw and Sw). For example, given a phrase with two words "$w_1$, $w_2$," e.g., (New York, New Jersey, or New Zealand), the plausible deniability metrics Nw and Sw may be defined as follows. First, by fixing the first word, e.g., $w_1$="New": Sw is the number of possible words that come after $w_1$ (in the example above, Sw=3). Therefore, the larger the value of Sw, the greater the plausible deniability. Nw may the probability attached to a given word after $w_1$ (e.g., York=50%, Jersey=30%, Zealand=20%). The smaller the value of Nw, the greater the plausible deniability. Therefore, if the original phrase is "New Zealand", the metrics Sw and Nw define how easy it is for an "adversary" to "guess" the full phrase given the word "New."

6. The information content score may be interpretable for endpoint scores (e.g., 0 and 1), and relative scores when comparing different natural language inputs.

Further, unbounded information content scores may be considered provided they are normalized to provide an output within the desired range.

The amount of information gained from a natural language input q, with respect to a base dataset D (e.g., trie 140 representing a vocabulary and/or a training dataset for a machine learning model), may be conceptually described as the level of surprise from observing the natural language input. This can be measured using different tools from the information theory literature. In various examples described herein, information theory metrics may be used to quantitatively describe this level of surprise. For example, the Shannon Information metric may be used and may be linked to the generalized Rényi entropy which defines other plausible deniability measures.

The Shannon (or bit) Information metric may be a function that measures information content and can be used, as described herein, as an identifiability metric for natural language inputs. In some examples described herein, the probability of a natural language input may be defined as a whole. Subsequently, the probability may be expanded to encompass the conditional probability of preceding tokens in the natural language input. Given a natural language input q, with probability Pr(q), the information content score 180 may be determined using a negative logarithm and may be defined as:

$$ICS(q) = -\log[Pr(q)] = \log[1/Pr(q)]$$

The information content may be related to the Shannon Entropy as follows: Taking the instantiated natural language input q as a random variable Q with different possible outcomes (e.g., "I am going to England" is semantically similar and comprises the same information content as "I am going to Britain"), then the entropy of Q is:

$$H(Q) = \Sigma PR[q] \cdot ICS(q) = E[ICS(q)]$$

As described above, the entropy of Q is also connected with existing metrics for word-level plausible deniability from the generalized Rényi entropy. Given a sample of probabilities p where $\Sigma p = 1$, the Rényi entropy of order $\alpha$ where $\alpha \geq 0$ and $\alpha \neq 1$ is:

$$H\alpha(Q) = 1/1 - \alpha \, \log[\Sigma p]$$

When $\alpha = 0$, the Hartley entropy results which approximates the Sw plausible deniability metric of Apache Madlib (corresponding to number of possible replacements for a given word). Similarly, as $\alpha \to \infty$ the min entropy is obtained which approximates the metric Nw (e.g., the probability of the word remaining unchanged). For the Rényi entropy, as $\alpha \to 1$, the Shannon entropy is determined (using L'Hôpital's rule to avoid dividing by 0), which is the expected value over the information content score metric.

Since the $ICS(q) \to +\infty$ as the probability of the given natural language input approaches zero, the information content score may be normalized to bound the metric between 0 and 1. The metric may be normalized by the min entropy (e.g., Nw which is the Rényi entropy, as $\to \infty$).

In the example system 100 depicted in FIG. 1, trie 140 represents the base dataset (e.g., a relevant training dataset and/or vocabulary). A trie (sometimes referred to as a "digital tree" or "prefix tree") is an ordered tree data structure used to store a dynamic set or associative array. Unlike a binary search tree, no node in the trie stores the key associated with that node. Instead a node's position within the trie defines the key with which it is associated.

In the example trie 140, there is a root node 142 and a plurality of levels 143, 144, 145, 146, descended from the root node 142. The nodes of the trie 140 (e.g., the circles) represent words of the base dataset. All the descendants of a given node (e.g., nodes that are directly or indirectly connected below the relevant node) have a common prefix of the words associated with the given node. The value of each node is a count of how many times the phrase starting from the root node 142 to the relevant node has been observed in the base dataset represented by the trie 140. The trie 140 may be used as a mechanism to split natural language inputs into two portions: 1) those found in the trie (e.g., first segment $q_1$), and 2) those not found within the trie (e.g., second segment $q_2$). In some examples, a cutoff threshold k may be used when separating natural language input 120. For example, a given word may be included in the first segment $q_1$ only if the node corresponding to the word in the trie 140 has a count that is greater than or equal to the threshold k. An example trie 140 is described in further detail below in reference to FIG. 2. The probability determination 170 and information content score 180 are determined using both the first segment $q_1$ and the second segment $q_2$, as described in further detail below.

In general, upon receipt of a natural language input 120 (represented as q), the trie 140 is used to determine a first segment $q_1$ of the natural language input 120 that is represented in the trie 140 (e.g., each word of the segment has a count value in the trie at the corresponding node that is greater than or equal to k) and a second segment $q_2$ of the natural language input 120 that is not represented in the trie 140 (e.g., each word of the segment is either not represented in the trie or has a count value at the corresponding node that is less than k). For example, for the natural language input "I am going to England," the first segment $q_1$ may be "I am going to" and the second segment $q_2$ may be "England"). After determining the first segment $q_1$ and the second segment $q_2$, the probabilities of each segment are determined, as described in further detail below.

Upon calculation of the probabilities for each segment (e.g., probability determination 170), the information content score for each segment is computed. For example, $ICS(q_1)$ is computed as $\log [1/Pr(q_1)]$. Additionally, the information content score is computed for $q_2$. The scores may then be normalized and a weighted sum of the scores may be determined as the information content score 180 for the natural language input 120, as described in further detail below. The information content score 180 represents the identifiability of the natural language input 120 and may be used to take one or more actions. For example, if the information content score 180 of natural language input 120 is above a information content score threshold, local device 110 may prevent the natural language input 120 from being sent off-device (e.g., to one or more remote computing device(s) 130).

The natural language input 120 may be split into the first segment $q_1$ and the second segment $q_2$ to avoid undue penalization of a query for not being fully matched in the trie 140 (e.g., due to a minor addition of a common word). Additionally, the natural language input 120 may be split into the first segment $q_1$ and the second segment $q_2$ to capture the weights given to common and rare phrases (e.g., those phrases not appearing in the trie 140, such as the phrases represented by second segment $q_2$) differently.

Figure 2:
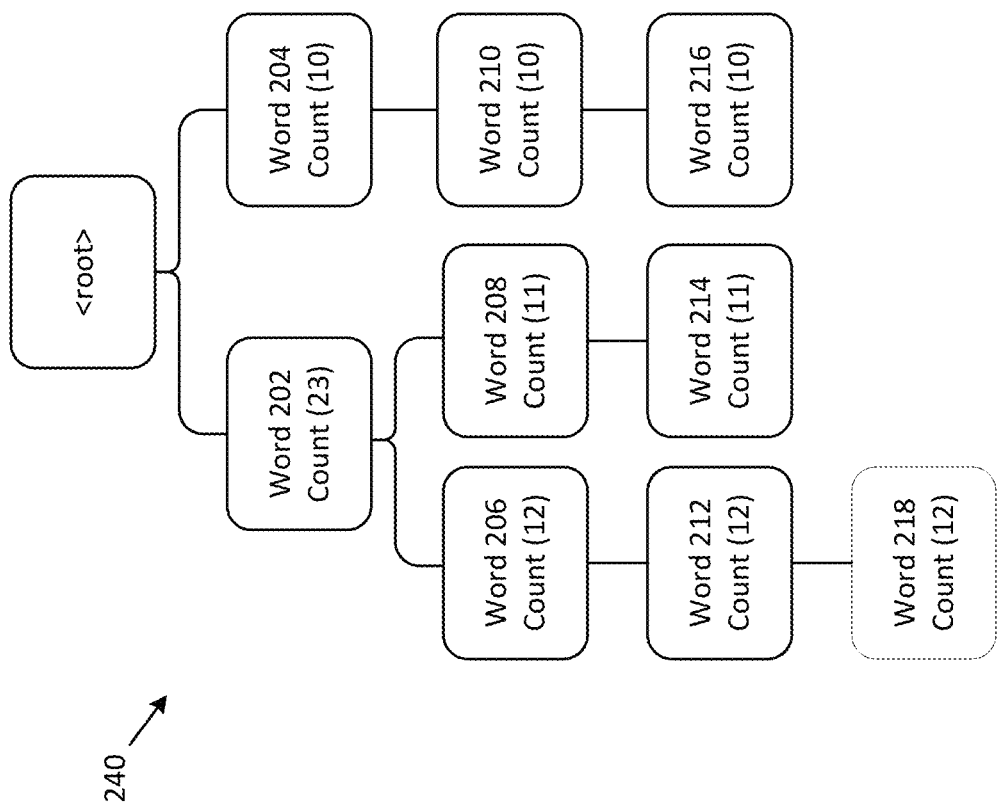
FIG. 2 depicts an example of a prefix tried that may be used to determine an information content score, in accordance with various embodiments of the present disclosure.

FIG. 2 depicts an example of a prefix trie 240 that may be used to determine an information content score, in accordance with various embodiments of the present disclosure. To determine the probability for a natural language input (e.g., natural language input 120 of FIG. 1), the chain rule may be used to compute the joint probability distribution using conditions probabilities. For example, given the natural language input, "hello world", the probability: P(A∩B) =P(B|A)·P(A) (e.g., P(world|hello)·P(hello). The probabilities are computed using the count values of the pertinent words (as represented in the order provided by the phrases of the natural language input) in the trie 240. The probability is determined word-by-word using numerator/denominator.

The prefix trie 240 of FIG. 2 depicts a root node (e.g., <root>) and a plurality of nodes descended from the root node. As previously described in reference to FIG. 1, the phrases words that are constituents of the phrases represented by the prefix trie 240 are depicted at different levels. In the example prefix trie 240 of FIG. 2, the example word 202 (associated with a count of 23) and the example word 204 (associated with a count of 10) are both at Word Level 1. The example words 206 (count 12), 208 (count 11), and 210 (count 10) are disposed at Word Level 2, the example words 212 (count 12), 214 (count 11), and 216 (count 10) are disposed at Word level 3, and the example Word 218 (count 12) is disposed at Word level 4. There may be additional (or fewer) levels and/or example words in other examples.

The numerator is determined by traversing the trie 240. For example, for the natural language input with word 202 followed by word 208, the trie 240 may first be traversed to determine the count for the word 202. Accordingly, the node count for the word 202 is 23. If a word or phrase is not found in the trie, a predefined value (e.g., 1 or any other desired number) may be selected as the numerator for determining the probability of that word/phrase.

The denominator is determined by listing all possible transitions conditioned on the root of the trie 240 (e.g., words that start the different phrases represented by the trie 240 that are associated with nodes connected to the root node). The count of all these words are summed and denoted as N.

Next, all possible transitions conditioned on word 202 (the node of the word currently being evaluated) are determined and their associated counts are summed. In this example, the words conditioned on word 202 are word 206, with count 12, and word 208, with count 11. The sum of these counts is denoted as C.

If a word belongs to a segment that is found in the trie 240 (e.g., segment $q_1$), the denominator is set as C. For words belonging to a segment that is not found in the trie 240 (e.g., segment $q_2$), the denominator is set as max(N, C).

To compute the information content score for the natural language input q (comprising segments $q_1$ and $q_2$) the following formula is used:

$$ICS(q_1,q_2) = -\log[Pr(q_1,q_2)] = -\log[Pr(q_1) \cdot Pr(q_2)]$$

$$= -\log[Pr(q_1)] - \log[Pr(q_2)]$$

$$= ICS(q_1) + ICS(q_2)$$

The scores for each word transition within the segment found in the trie 240 (e.g., the high frequency sub-phrase represented by first segment $q_1$) are summed. Separately, the scores for each word transition within the segment not found in the trie 240 (e.g., the low frequency sub-phrase represented by second segment $q_1$) are summed.

The normalizer value for each segment (e.g., $q_1$ and $q_2$) is computed as:

$$Z_s = -\log[1/N] * num\_words\_in\_segment.$$

The combined information content score (e.g., information content score 180) is the weighted average of the normalized scores for segments $q_1$ and $q_2$. The normalized score for each segment is multiplied by the proportion of the number of words in that segment to the total number of words in the natural language input.

Example 1

The following is an example referencing the trie 240 of FIG. 2 and using the natural language input q "word 202, word 206, undefined word, undefined word." For example, the natural language input q may be the phrase "buy me some goods" where "buy" corresponds to word 202, "me" corresponds to word 206, and the words "some" and "goods" are not found in the trie 240. This natural language input is initially split into a high frequency segment $q_1$ that is found in trie 240 and a low frequency segment $q_2$ that is not found in the trie 240. In this example, $q_1$ is ['buy', 'me'] and $q_2$ is ['some', 'goods'].

Example 1—First Segment

For segment $q_1$ ['buy', 'me'] (e.g., words 202 and 206) (segment is found in trie 240):

Sub-Phrase 1

Current sub-phrase: buy (word 202)

Word count (numerator): 23 (count for node word 202 in trie 240)

Denominator N=33 (sum of counts of 'word 202 and word 204 nodes in trie 240)

Current sub-phrase probability 0.69697 (numerator/denominator N)

Information Content: −log [Pr(w)] 0.52083

Total score so far $q_1$: 0.52083

Sub-Phrase 2

Current sub-phrase: buy me (word 202 and word 206)

Word count (numerator): 12 (count for node word 206 in trie 240)

Using C as denominator, C=23 (sum of counts of 'word 206 and word 208 in trie 240)

Current sub-phrase probability 0.52173 (numerator/denominator C)

Information Content: −log [Pr(w)] 0.93860

Total score so far $q_1$: 1.4594 (sum of information contents so far: 0.52083+0.93860)

Number of words in segment $q_1$=2

Normalizer value: −log [1/N]*num_words_in_segment=10.089

Example 1—Second Segment

For segment $q_2$ ['some', 'goods'] (e.g., words not found in trie 240)

Sub-Phrase 1

Current sub-phrase: some

Word count (numerator): 1 ('some' not found in trie, set numerator to 1)

Using N as denominator, N=33

Current sub-phrase probability 0.03030 (numerator/denominator N)

Information Content: −log [Pr(w)] 5.0444

Total score so far $q_2$: 5.0444

Sub-Phrase 2
Current sub-phrase: some goods
Word count (numerator) 1 (1 goods' not found in trie, set numerator to 1)
Using N as denominator, N=33
Current sub-phrase probability 0.03030 (numerator/denominator N)
Information Content: −log [Pr(w)] 5.0444
Total score so far $q_1$: 10.089 (sum of information content so far: 5.0444+5.0444)

Example 1—Normalization and Total Weighted ICS

Normalizer: −log [1/N] *num words in segment=10.089
Score for phrase ($q_1$) found in trie (score/normalizer): 0.14466
Score for phrase ($q_2$) not found in trie (score/normalizer): 1.0
Total weighted score (length q1*score q1)+(length q2*score q2)=0.57233

Example 2

The following is an example referencing the trie 240 of FIG. 2 and using the natural language input q "buy me running shoes" (which may correspond to words 202, 206, 212, and 218, respectively). This natural language input is entirely found within trie 240, accordingly, all words of the phrase are included in high frequency segment $q_1$ and low frequency segment $q_2$ is empty. Accordingly, in this example, $q_1$ is ['buy' (word 202), 'me' (word 206), 'running' (word 212), 'shoes' (word 218)] and $q_2$ is [ ].

Example 2—First Segment

For segment $q_1$ ['buy' (word 202), 'me' (word 206), 'running' (word 212), 'shoes' (word 218)] (segment is found in trie 240):
Sub-Phrase 1
For segment $q_1$
Current sub-phrase: buy (word 202)
Word count (numerator) 23 (count for node 'buy' in trie 240)
Denominator N=33 (sum of counts of 'buy' (word 202) and 'good' (word 204) nodes in trie 240)
Current sub-phrase probability 0.69697 (numerator/denominator N)
Information Content: −log [Pr(w)] 0.52083
Total score so far $q_1$: 0.52083
Sub-Phrase 2
Current sub-phrase: buy me (word 202, word 206)
Word count (numerator): 12 (count for node 'me' (word 206) in trie 240)
Using C as denominator, C=23 (sum of counts of 'me' (word 206) and 'red' (word 208) in trie 240)
Current sub-phrase probability 0.52173 (numerator/denominator C)
Information Content: −log [Pr(w)] 0.93860
Total score so far $q_1$: 1.4594 (sum of information contents so far: 0.52083+0.93860)
Sub-Phrase 3
Current sub-phrase: buy me running (word 202, word 206, and word 212)
Word count (numerator): 12 (count for node 'running' (word 212) in trie 240)
Using C as denominator, C=12 (count for node 'running' (word 212) in trie 240)
Current sub-phrase probability 1.0 (numerator/denominator C)
Information Content: −log [Pr(w)] 0.0
Total score so far: 1.4594
Sub-Phrase 4
Current sub-phrase: buy me running shoes (word 202, word 206, word 212, word 218)
Word count (numerator): 12 (count for node 'shoes' (word 218) in trie 240)
Using C as denominator, C=12 (count for node 'shoes' (word 218) in trie 240)
Current sub-phrase probability 1.0 (numerator/denominator C)
Information Content: −log [Pr(w)] 0.0
Total score so far: 1.4594

Example 2—Second Segment

For segment $q_2$ [ ] (segment is not found in trie 240)

Example 2—Normalization and Total Weighted ICS

Normalizer: −log [1/N]*num words in segment=20.178
Score for phrase ($q_1$) found in trie (score/normalizer): 0.072329
Score for phrase ($q_2$) not found in trie (score/normalizer): 0.0
Total weighted score (length q1*score q1)+(length q2*score q2)=0.072329

Example 3

The following is an example referencing the trie 240 of FIG. 2 and using the natural language input q "no words in trie." No words of this natural language input are found within trie 240, accordingly, all words of the phrase are included in low frequency segment $q_2$ and high frequency segment $q_1$ is empty. Accordingly, in this example, $q_1$ is [ ] and $q_2$ is ['no', 'words', 'in', 'trie'].

Example 3—First Segment

For segment $q_1$ [ ] (segment is not found in trie 240)

Example 3—Second Segment

For segment $q_2$ ['no', 'words', 'in', 'trie'] (segment is not found in trie 240)
Sub-Phrase 1
Current sub-phrase: no
Word count (numerator) 1 ('no' not found in trie, set numerator to 1)
Using N as denominator, N=33
Current sub-phrase probability 0.030303 (numerator/denominator N)
Information Content: −log [Pr(w)] 5.0444
Total score so far: 5.0444
Sub-Phrase 2
Current sub-phrase: no words
Word count (numerator) 1 ('words' not found in trie, set numerator to 1)
Using N as denominator, N=33
Current sub-phrase probability 0.030303 (numerator/denominator N)
Information Content: −log [Pr(w)] 5.0444
Total score so far: 10.089

Sub-Phrase 3
Current sub-phrase: no words in
Word count (numerator) 1 ('in' not found in trie, set numerator to 1)
Using N as denominator, N=33 (numerator/denominator N)
Current sub-phrase probability 0.030303
Information Content: −log [Pr(w)] 5.0444
Total score so far: 15.133
Sub-Phrase 4
Current sub-phrase: no words in
Word count (numerator) 1 ('trie' not found in trie, set numerator to 1)
Using N as denominator, N=33 (numerator/denominator N)
Current sub-phrase probability 0.030303
Information Content: −log [Pr(w)] 5.0444
Total score so far: 20.178

Example 3—Normalization and Total Weighted ICS

Normalizer: −log [1/N]*num words in segment=20.178
Score for phrase ($q_1$) found in trie (score/normalizer): 0.0
Score for phrase ($q_2$) not found in trie (score/normalizer): 1.0
Total weighted score (length q1*score q1)+(length q2*score q2)=1.0

Figure 3:
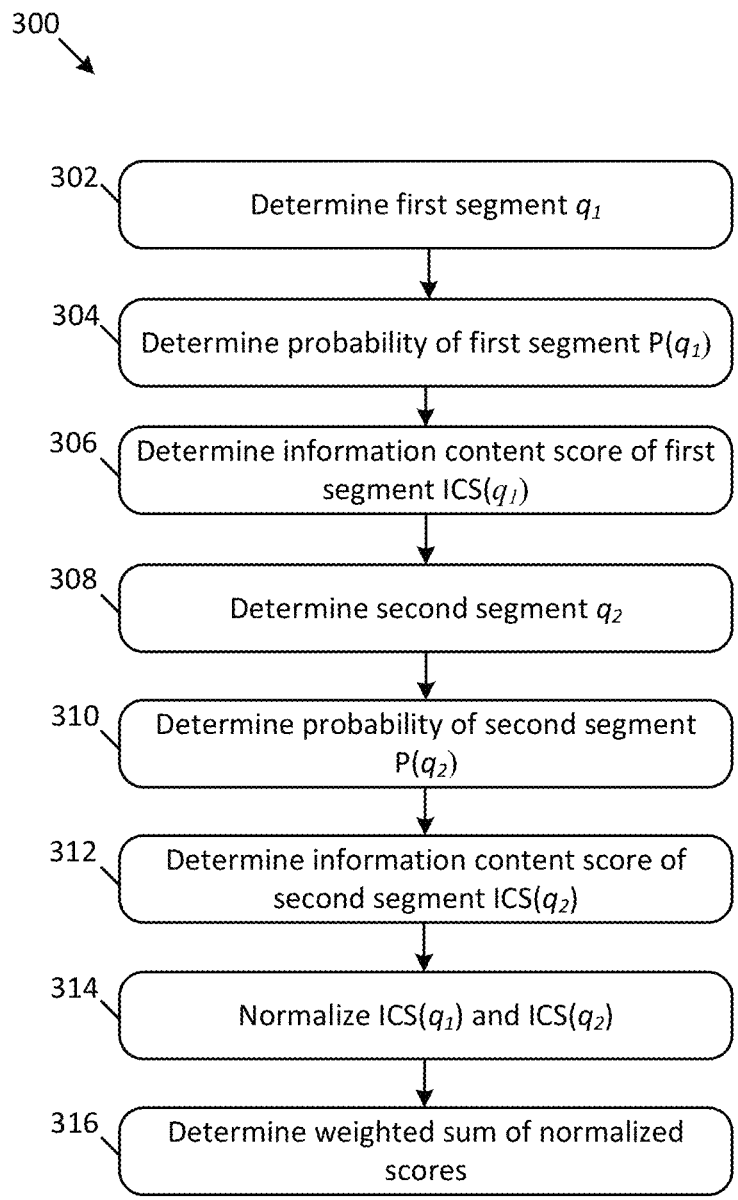
FIG. 3 depicts a flow chart showing an example process for determining an information content score of a natural language input, in accordance with various aspects of the present disclosure.

FIG. 3 depicts a flow chart showing an example process 300 for determining an information content score of a natural language input, in accordance with various aspects of the present disclosure. Those portions of FIG. 3 that have been previously discussed in reference to FIGS. 1-2 may not be described again for purposes of clarity and brevity. The actions of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 300 of FIG. 3 may begin at action 302, at which a first segment $q_1$ of a natural language input may be determined. As previously described, the first segment $q_1$ may be a high frequency segment that is represented in a data structure representing a base dataset over which the information content score is evaluated. For example, a prefix trie data structure (e.g., trie 140, 240) may be used to determine the first segment $q_1$. The first segment $q_1$ may be the consecutive words of a phrase (e.g., from beginning to end) represented by the natural language input that are found within the data structure. In some cases, the first segment $q_1$ may be those consecutive words of the natural language input that are both found within the data structure and are associated with count values above a selected and/or calculated frequency threshold (e.g., k=10 or some other suitable value).

Process 300 of FIG. 3 may continue from action 302 to action 304, at which a probability of the first segment $P(q_1)$ may be determined. As previously described, to determine the conditional probability $P(q_1)$ of each word in the first segment $q_1$ the data structure (e.g., the trie) may be traversed to determine the count of the current word. The count for the current word is defined as a numerator of a fraction used to determine the probability $P(q_1)$. The sum of all transitions from the root node of the trie is determined as N. Additionally, the sum of all transitions from a word that the current word is conditioned on (e.g., P(A) in P(B|A)) is determined from the trie as C. The denominator for the first word of a natural language input for purposes of determining probability is the numerator/N. For subsequent words in first segment $q_1$, the denominator is C.

Process 300 of FIG. 3 may continue from action 304 to action 306, at which an information content score of the first segment $q_1$ may be determined. The information content score may be determined for each sub-phrase of the first segment $q_1$ as −log [Pr($q_1$)], as described above in reference to FIG. 2. The information content scores of each sub-phrase of first segment $q_1$ may be summed, as described above, in order to determine a total information content score for first segment $q_1$ (that is both unnormalized and unweighted).

Process 300 of FIG. 3 may continue from action 306 to action 308, at which a second segment $q_2$ of a natural language input may be determined. As previously described, the second segment $q_2$ may be a low frequency segment that is not represented in a data structure representing a base dataset over which the information content score is evaluated. For example, a prefix trie data structure (e.g., trie 140, 240) may be used to determine the second segment $q_2$. The second segment $q_2$ may be the words of the phrase represented by the natural language input that are not found within the data structure. In some cases, the second segment $q_2$ may include those words of the natural language input that are found within the data structure, but which are associated with count values below a selected and/or calculated frequency threshold (e.g., k=10 or some other suitable value). In general, words of the second segment increase the information content score as such words are rare (and/or are undefined) with respect to the base dataset and thus tend to provide more information about the natural language input.

Process 300 of FIG. 3 may continue from action 308 to action 310 at which a probability of the second segment $P(q_2)$ may be determined. The numerator for each sub-phrase of the second segment may be set to 1 or some other selected value. The sum of all transitions from the root node of the trie is determined as N. Additionally, the sum of all transitions from a word that the current word is conditioned on (e.g., sum of all transitions from node with P(A) in P(B|A)) is determined from the trie as C. The denominator for determining sub-phrases of the second segment $q_2$, is max(N, C).

Process 300 of FIG. 3 may continue from action 310 to action 312, at which an information content score of the second segment $q_2$ may be determined. The information content score may be determined for each sub-phrase of the second segment $q_2$ as −log [Pr($q_2$)], as described above in reference to FIG. 2. The information content scores of each sub-phrase of second segment $q_2$ may be summed, as described above, in order to determine a total information content score for second segment $q_2$ (that is both unnormalized and unweighted).

Process 300 of FIG. 3 may continue from action 312 to action 314, at which the information content scores of the first segment $q_1$ and second segment $q_2$ (e.g., ICS($q_1$) and ICS($q_2$), respectively) may be normalized. The respective scores may be normalized by dividing each score (e.g., ICS($q_1$) and ICS($q_2$)) by normalizer $Z_s$=−log[1/N]*num_words_in_segment.

Process 300 of FIG. 3 may continue from action 314 to action 316, at which the weighted sum of the normalized score may be determined. The weighted sum may be determined by multiplying the normalized score for each segment (e.g., first segment $q_1$ and second segment $q_2$) by the proportion of total words in that segment. For example, the normalized score for the first segment $q_1$ may be multiplied by the fraction (num of words in $q_1$/total num words) to determine the weighted, normalized score for the first segment $q_1$. Similarly, the normalized score for the second segment $q_2$ may be multiplied by the fraction (num of words in $q_1$/total num words) to determine the weighted, normalized score for the second segment $q_2$. The weighted normalized score for each segment may then be added to determine to total normalized, weighted score for the natural language input. As described in further detail below, the total normalized, weighted score (e.g., ICS(q)) for the natural language input may be compared to a threshold to determine an action to be taken with respect to the natural language input. In one example, the natural language input q may be prevented from being sent off-device when ICS(q) exceeds the threshold. In various other examples, the natural language input q may be sent to pre-defined, authenticated, and/or trusted devices when ICS(q) exceeds the threshold.

In various examples, the information content score of a particular natural language input may represent a risk that a source of the natural language input may be determined based on the natural language input itself (e.g., using an MIA). Accordingly, in some examples, a threshold may be defined to delineate between natural language inputs that are of acceptable risks and those that should be detained on-device and/or should be modified prior to sending off-device. Various approaches for determining such thresholds are described below. Generally, in the description below, a natural language input may be referred to as a "query." In some examples, statistical and/or machine learning based approaches may be used to determine an appropriate threshold for information content scores. For example, a statistical method may be used to determine an ICS threshold and a machine learning model may be used to verify the threshold.

The base dataset D for determining a threshold may be the training queries (e.g., natural language inputs) used to build the ICS data structure (e.g., trie 140, 240, etc.). The base dataset may be a historical, aggregated dataset. The sample data set D* may comprise queries q* (e.g., natural language inputs) sampled during use of a speech processing system and/or otherwise aggregated separately from the base dataset D. The sample dataset D* may be drawn from the dataset for which the ICS threshold is to be defined. Similar queries q*,q may be defined as follows: for every q* in D*, the closest match q in D is the 'similar' query (e.g., determined by traversing the trie to find a permutation of q# that has the highest possible overlap with q).

In an example, a natural language input may be determined to be of low risk of identifying the source of the natural language input where $Pr[ICS(q^*)=x] \leq \alpha_t \cdot Pr[ICS(q)=x]$ for all sub-samples of q*, q at an ICS of x less than threshold t. The multiplicative bound a may be defined by (1) the particular implementation details of the approach, and (2) the tolerance of the particular use case. For example, the tolerance of the use case may be defined to be loose or strict to accommodate a feedback mechanism.

The statistical approach to threshold determination uses the confidence intervals of the information content scores to locate at which threshold there exists a statistically significant difference between the set of unique queries being measured [q*], and the corresponding set of their closest queries [q] from the base dataset. The machine learning approach to threshold determination/verification may model the identifiability of a set of query sources $X_0 \ldots X_n$ (e.g., users), who are assigned a mix of the same base queries [q] and different individually unique queries [q*]. In some examples, queries [q*] that fall below an appropriate threshold may not be susceptible to an MIA.

In a statistical approach to ICS threshold determination (given the sample dataset D*), a lower bound starting threshold (e.g., 0.1 or some other suitable value) and an increment step size (e.g., 0.1, etc.) may be defined. A set of queries [q*] in D where ICS(q*) is less than the current threshold may be selected. In various examples, a check may be performed that the current set size is at least a minimum set size for statistical significance. Additionally, in some examples, the set size may be capped at a maximum size. For each q* the q may be found that is the longest contiguous match of q* in the trie. The ICS(q) may be computed for all corresponding queries q, q* and confidence intervals may be calculated (e.g., 99% confidence intervals) for [q*] and [q]. A determination may be made whether or not the confidence intervals overlap. If there is an overlap, the threshold may be incremented by the selected increment size and another set of queries [q*] in D may be determined where ICS(q*) is less than the current threshold (as described above). If there is no overlap, a verification step may be used to verify that the difference is at least 3 standard deviations (or some other suitable value) apart. If there is sufficient distance between the score distributions, the threshold may be selected for use.

A machine learning model may be used to verify the threshold value determined using the statistical method described above. A membership inference auditor may be used to detect the presence of a particular query in the training dataset of a machine learning model. If the ICS threshold is appropriate, query sources of queries with ICS scores below the threshold should not be detectable. Conversely, query sources of queries with ICS scores above the threshold should be detectable using the model.

Figure 4:
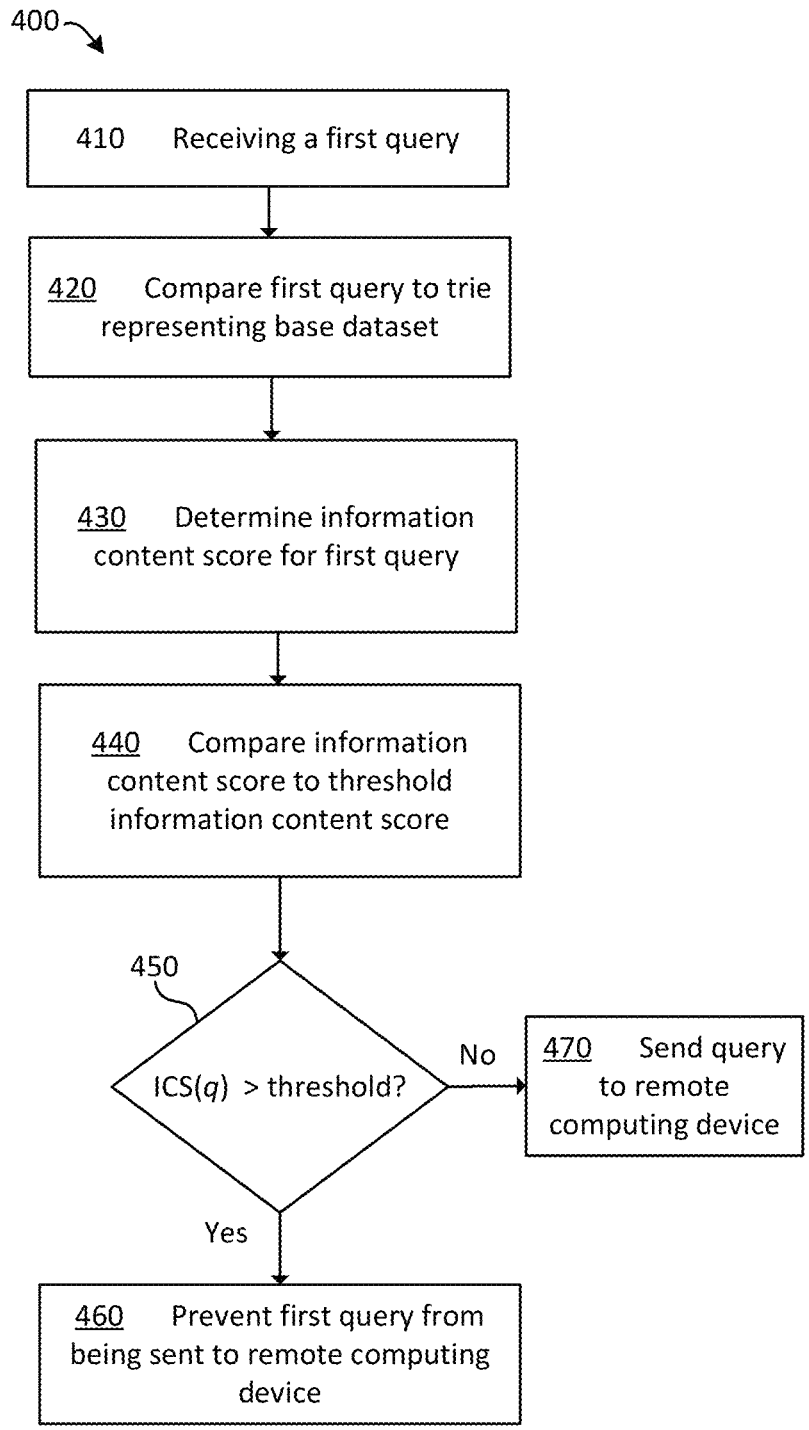
FIG. 4 depicts a flow chart showing an example process for controlling routing of a natural language input query, in accordance with various aspects of the present disclosure.

FIG. 4 depicts a flow chart showing an example process 400 for controlling routing of a natural language input query, in accordance with various aspects of the present disclosure. Those portions of FIG. 4 that have been previously discussed in reference to FIGS. 1-3 may not be described again for purposes of clarity and brevity. The actions of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 410, at which a first query (e.g., a natural language input q) may be received. In an example, the first query may be a natural language input (e.g., a spoken command and/or request, input text, etc.) received by a speech processing system that has been translated into text using ASR.

Process 400 may continue from action 410 to action 420, at which the first query may be compared to a trie representing a base dataset. At action 420, the first query may be compared to the trie in order to separate the first query into a first segment ($q_1$) of contiguous words of the first query found in the trie (e.g., with count values above the count value threshold k) and a second segment ($q_2$). The relevant count values for words of the first query that are present in the trie may be determined as described above.

Process 400 may continue from action 420 to action 430, at which an information content score for the first query may be determined. ICS(q) may be determined as described above based on the probability of the query. In various examples, the information content score may be normalized and/or weighted as described above in reference to FIGS. 1 and 2. Process 400 may continue from action 430 to action 440 at which the information content score ICS(q) may be compared to a threshold information content score (e.g., the ICS threshold described above). At action 450, if the ICS(q) is greater than the ICS threshold processing may continue to action 460 at which a particular action may be taken to mitigate the risk of the first query being attributed to a particular source (e.g., a particular user). For example, as described at action 460, a local device may prevent the first query from being sent to a remote computing device based at least in part on the ICS(q) exceeding the ICS threshold. In some further examples, the ICS(q) being greater than the ICS threshold may affect a routing destination of the first query. For example, if the ICS(q) is greater than the ICS threshold the first query may only be sent to secure and/or authenticated destinations, as opposed to less secure and/or unauthenticated destinations.

Conversely, if at action 450, the ICS(q) is less than (or equal to) the ICS threshold, processing may continue to action 470 at which the first query may be processed as normal. In some examples, this may include sending the first query to one or more remote computing devices (e.g., remote computing device(s) 130) for further processing. In various other examples, instead of, or in addition to the action 470, the first query may be deleted or saved (e.g., saved on the device determining the information content score). In some additional examples, at action 470 the information may be encrypted or left unencrypted prior to sending to one or more remote computing devices. In some further examples, the first query language may be deemed to be usable in advertisements on the basis of the information content score being less than or equal to the ICS threshold.

Figure 5:
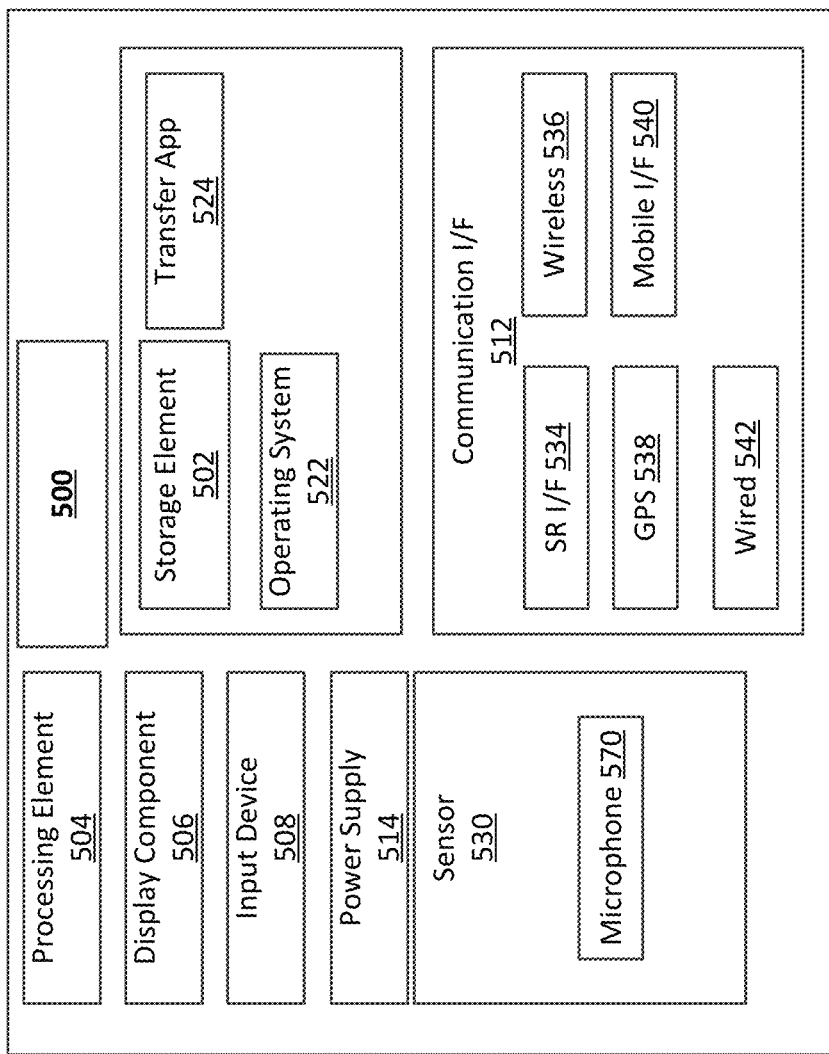
FIG. 5 is a block diagram showing an example architecture of a computing device that may be used to determine an information content score, in accordance with various embodiments described herein.

FIG. 5 is a block diagram showing an example architecture 500 of a computing device that may be configured to determine information content scores and/or information content score thresholds, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or data representations of the base dataset (e.g., tries 140, 240) described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components. The components of the natural language processing system, as described herein, are exemplary, and may be located as a stand-alone device or may be included, in whole or in part, as a component of a larger device or system.

Figure 6:
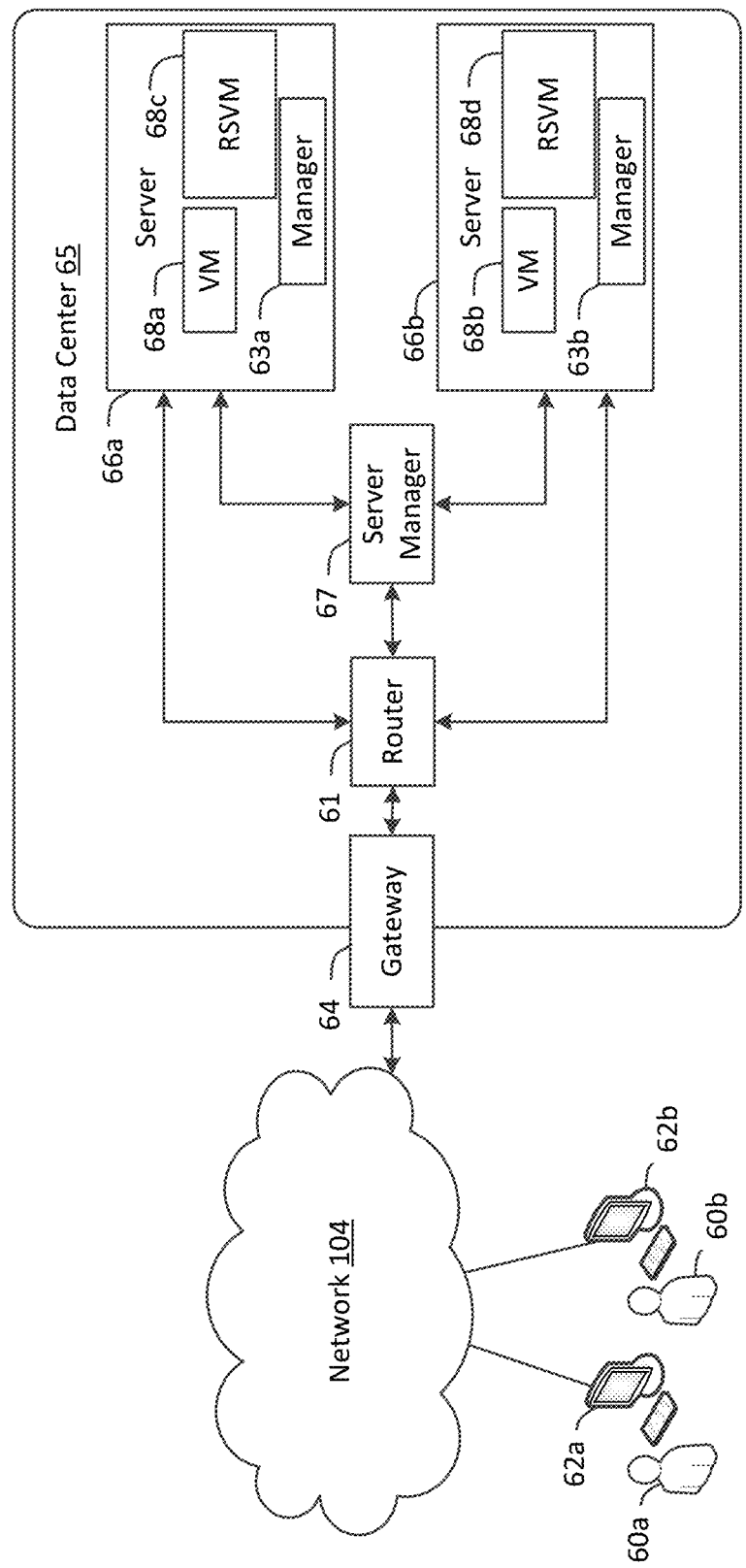
FIG. 6 is a diagram illustrating an example system for sending and providing data that may be used in accordance with the present disclosure.

An example system for sending and providing data and processing data of natural language processing systems will now be described in detail. In particular, FIG. 6 illustrates an example computing environment in which the embodiments described herein may be implemented. For example, the computing environment of FIG. 6 may be configured to provide natural language processing as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various natural language processing and/or information content score determining techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
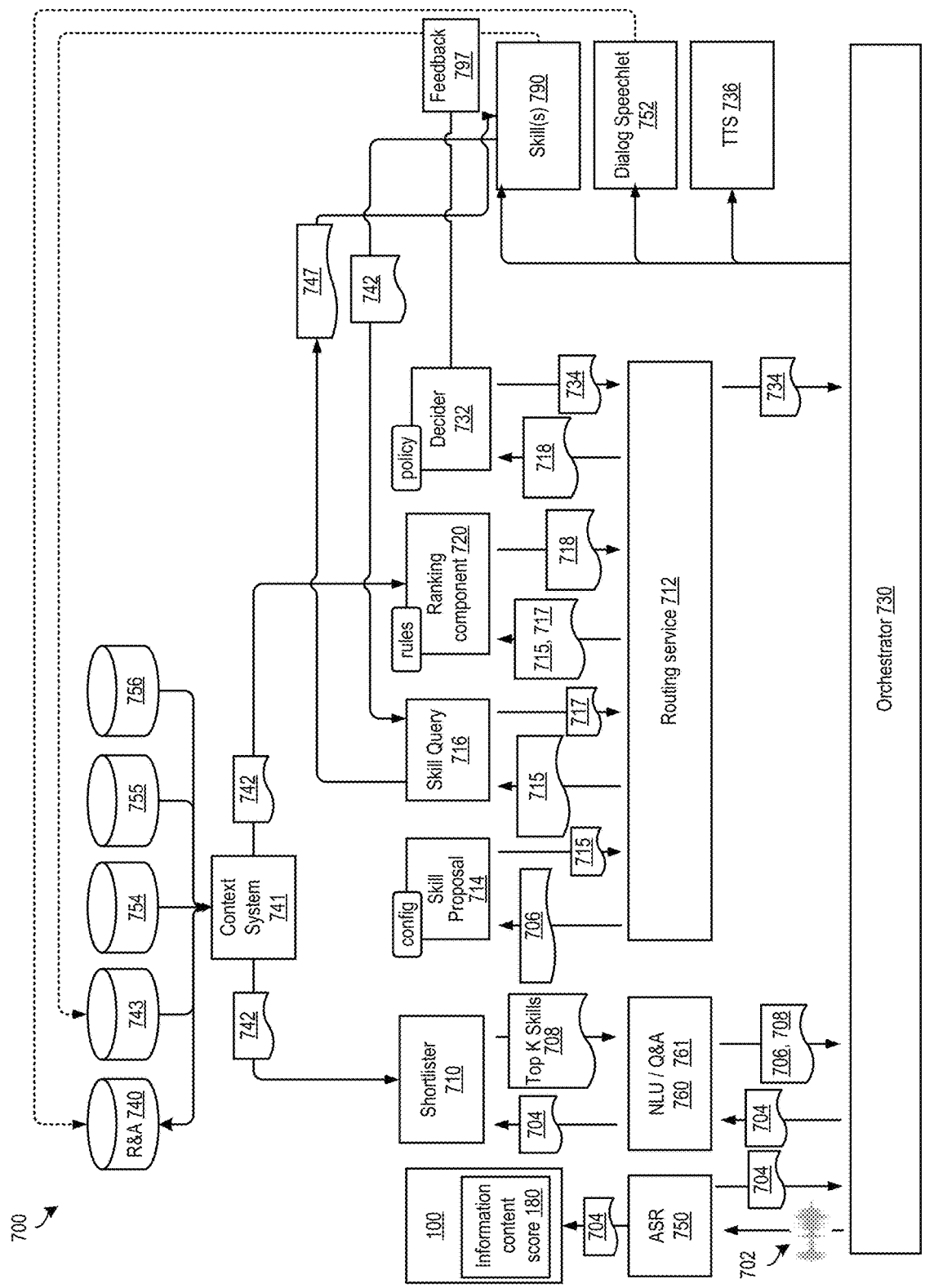
FIG. 7 is a block diagram illustrating an example speech processing system that may be used according to various embodiments of the present disclosure.

FIG. 7 is a block diagram illustrating an example speech processing system 700, according to various embodiments of the present disclosure. In various examples, the speech processing system may be effective to determine the information content score 180 of natural language input data (e.g., audio data 702 and/or other natural language input). For example, the speech processing system 700 may employ system 100 to determine information content score 180 representing a degree of uniqueness of the natural language input relative to a particular dataset of words and/or meaning representations. In various other examples, text data 704 generated by an ASR component 750 of the speech processing system 700 may be sent to system 100 and an information content score 180 may be determined for the natural language data represented by the text data 704. In some further examples, various data generated by the speech processing system 700 may be stored in one or more databases. In at least some examples, the natural language data may include sensitive information. Accordingly, in some examples, an information content score 180 may be generated for various natural language data stored in one or more of the databases of the speech processing system 700. The information content score 180 may be used to determine routing destinations, appropriate uses for the natural language data, and/or whether or not the data should be stored or deleted based on the information content score.

The various components illustrated FIG. 7 may be located on the same or different physical devices. Communication between various components illustrated in FIG. 7 may occur directly or across a network. A speech processing-enabled device may capture audio using an audio capture component, such as one or more microphone(s). The speech processing enabled device may send audio data 702 (e.g., corresponding to an utterance) to an orchestrator 730 of the speech processing system 700. The speech processing enabled device may also send metadata (e.g., including device identifiers, device type data, contextual data, IP address data, room location data, etc.) to the orchestrator 730. The components depicted in FIG. 7, including components of a speech processing system may be generally referred to as spoken language processing components, a speech processing system 700 a spoken language processing system, speech processing components, and/or a speech processing routing system. Additionally, in various examples, the components depicted in FIG. 7 may process written input (e.g., text data) in addition to spoken input.

Upon receipt by the speech processing system 700, the audio data 702 may be sent to an orchestrator 730. The orchestrator 730 may include memory and logic that enables the orchestrator 730 to initiate a dialog session and to transmit various pieces and forms of data to various components of the system, as described in further detail below.

The orchestrator 730 may send the audio data 702 to an ASR component 750 (e.g., a speech recognition component). The ASR component 750 may transcribe the audio data 702 into one or more hypotheses representing speech contained in the audio data 702. The ASR component 750 interprets the speech in the audio data based on a similarity between the characteristics of the audio data corresponding to the speech and pre-established language models. For example, the ASR component 750 may compare the audio data 702 with models for sounds (e.g., subword units such as phonemes) and sequences of sounds to identify words that match the sequence of sounds in the speech represented in the audio data 702. The ASR component 750 may send text data 704 generated thereby to orchestrator 730 that may, in turn, send the text data 704 to NLU component 760. In various examples, the orchestrator 730 and/or the ASR component 750 may send the text data to the system 100 that may generate an information content score 180 for the text data 704. The information content score 180 may be used to make various determinations about the text data 704. For example, as previously described, text data with an information content score 180 above a threshold may be prevented from being sent off-device to one or more remote computing devices to avoid divulging potentially sensitive data. In some other examples, routing decisions may be made on the basis of the information content score 180, as described below in reference to FIG. 8.

As previously described, the text data 704 may include one or more ASR hypotheses. The text data 704 may include a top scoring hypothesis of the speech represented in the audio data 702 or may include an N-best list including a group of hypotheses of the speech represented in the audio data 702, and potentially respective ASR processing confidence scores. As previously described, in some other examples, the ASR component 750 (and/or other components of the speech processing system 700) may generate other metadata associated with the utterance such as an overall utterance confidence score, per-word (e.g., per token) confidence scores for the utterance, utterance duration, stream duration (e.g., duration of the stream of audio data from speech processing enabled device to speech processing system 700), a number of tokens output by ASR, etc.

The NLU component 760 attempts to make a semantic interpretation of the phrases or statements represented in the text data input therein. That is, the NLU component 760 determines one or more meanings associated with the phrases or statements represented in the text data 704 based on individual words represented in the text data 704. The NLU component 760 interprets a text string to derive an intent of the user (e.g., an action that the user desires be performed) as well as pertinent pieces of information in the text data that allow a device (e.g., the speech processing enabled device, the speech processing system 700, a computing device(s) implementing a skill, etc.) to complete the intent. For example, if the text data 704 corresponds to "Set temperature to 74 degrees," the NLU component 760 may determine the user intended to invoke a climate intent with a target temperature value slot of 74 degrees Fahrenheit. As previously described, in addition to the NLU intent and slot data, the NLU component 760 may generate other metadata associated with the utterance (e.g., with the audio data 702). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, entity recognition match types (e.g., exact match, prefix match, suffix match, etc.), etc. Herein, the data output by the NLU component 760 (depicted in FIG. 7 as "NLU 760") is referred to as NLU output data 706.

In some examples, text data 704 may be sent to a question and answer (Q&A) component 761 that may use one or more knowledge bases and/or knowledge graphs to answer a question represented in the text data 704. In at least some examples, the question and answer component 761 may determine an answer to the question in parallel with processing of the text data 704 by NLU component 760. In various examples, the question and answer component 761 may be configured to output structured data (e.g., a meaning representation) representing an answer to a question present in the text data 704. For example, the answer to a question may comprise triple data including a subject, object, and predicate, as described herein. However, in some examples, the meaning representation may be other structured data, apart from triple data, as known to those skilled in the art. The text data may thereafter be output by text to speech component 736. In various examples, the decider 732 and/or the ranking component 720 may determine whether the output from the question and answer component 761 or the NLU output data 706 is more likely to address a particular user input.

NLU component 760 may send the text data 704 and/or some of NLU output data 706 (such as intents, recognized entity names, slot values, etc.) to a shortlister 710. The shortlister 710 may comprise one or more machine learning models that may be effective to predict a subset of skills that are most likely to be able to correctly process the input data, based on the input of the text data 704 and/or the NLU output data 706. In addition, the shortlister 710 may call the ranking and arbitration component 740 to request features pre-computed by the ranking and arbitration component 740 according to features used as inputs by the machine learning models of shortlister 710. As previously described, the shortlister 710 may define source data used to compute the features and/or may specify functions used to generate the features from the source data (e.g., formulae and/or functions) prior to runtime processing of input data. The ranking and arbitration component 740 may precompute the features according to the specified feature definitions supplied by shortlister 710 and by the other components of speech processing system 700 and may store the precomputed features in memory. Ranking and arbitration component 740 may generate indexes that may be used to retrieve the precomputed features during runtime (e.g., through an API). Accordingly, during runtime processing, shortlister 710 may retrieve the precomputed features from ranking and arbitration component 740 and may use the precomputed features (among other inputs) to predict a subset of skills that are most likely to be appropriate to process the current input data. In some examples, in addition to predicting a subset of skills, shortlister 710 may predict whether or not question and answer service 761 is likely to generate an appropriate response to the current input data. Accordingly, shortlister 710 may send the top K skills 708 to NLU component 760. NLU component 760 may thereafter perform skill-specific NLU processing (and/or question-and-answer processing by question and answer component 761) for the skills in the top K skills 708 to determine skill-specific intents, slots, and/or named entities. NLU output data 706 may include such skill-specific data (e.g., skill-specific N-best hypotheses).

Ranking and arbitration component 740 may communicate with various systems in order to obtain source data used to precompute features. For example, ranking and arbitration component 740 may communicate with feedback storage 743 to receive user feedback data (e.g., explicit and/or implicit user feedback related to user satisfaction with processing of input data). In various examples, the user feedback data may be user-specific and/or device specific and may indicate whether a user was satisfied or not satisfied with a particular interaction with speech processing system 700. As previously discussed, in various examples user feedback data may be predicted for input data prior to processing the input data using a skill 790. In various examples, user feedback data may be used to pre-compute various features used by machine learning models of speech processing system 700. Accordingly, in some examples, the skills selected for processing particular input data may be determined based at least in part on skills that a user (or a group of similar users) has responded positively to in the past.

Additionally, ranking and arbitration component 740 may communicate with endpoint context system 754, which may provide context data at the conclusion of a user interaction with the speech processing system 700. In another example, ranking and arbitration component 740 may communicate with skill data 756 to determine information from the skill regarding past interactions with the skill and/or data acquired by the skill. Additionally, ranking and arbitration component 740 may communicate with other data sources 755, as new services are added and/or as new data types that may be useful for routing prediction are made available. In addition to ranking and arbitration component 740 using context data 742 to precompute features used by various machine learning models of the routing architecture of the speech processing system 700, a context system 741 may receive the context data 742. The context system 741 may provide the context data directly to both ranking and arbitration component 740 as well as to various components of the routing architecture of speech processing system 700. For example, the context system 741 may send context data 742 to shortlister 710 and/or ranking component 720 in order to determine a shortlist of skills 790 for particular input data and/or in order to rank the shortlisted skills.

NLU output data 706 (which may, in some examples, include question and answer output data) and top K skills 708 may be sent by NLU component 760 to orchestrator 730. Orchestrator 730 may send the top K skills 708 and the NLU output data 706 to routing service 712. Routing service 712 may send the top K skills 708 and NLU output data 706 to skill proposal component 714. Skills 790 may subscribe to particular intents using skill proposal component 714. Accordingly, skill proposal component 714 may receive the NLU output data 706 and may determine whether any of the included intents correspond to one or more of skills 790. If so, skill proposal component 714 may generate candidate data comprising <Intent, Skill> candidate pairs 715. The candidate pairs 715 may be sent to routing service 712 and may be sent by routing service 712 to skill query service 716. Skill query service 716 comprises an API through which skills 790 may "opt out" of particular requests. For example, a skill 790 may comprise a video playback skill. Accordingly, the skill 790 may register with skill query service 716 to indicate that only requests made on a device with a display screen should be routed to the particular skill 790. In addition, skills 790 may communicate availability information, pricing information, and/or other structured descriptions of how and under what circumstances (e.g., determined using context data) the skill 790 can fulfill a request represented by the current input data. Skill query service 716 may send a signal 717 indicating what skills can fulfill a particular request (and/or what skills are unable to fulfill the request). The signal 717 may be sent to routing service 712. Routing service 712 may send the signal 717 along with the candidate pairs 715 to a ranking component 720. Skills 790 may send context data 742 to skill query service 716 to indicate situations in which a skill may opt out of processing a particular request (e.g., if the device sending the input data does not include a display screen, etc.). In various examples, the context data 742 sent by skills 790 to skill query service 716 may be skill and/or request specific context data. Additionally, skill query service 716 may send intent requests 747 to skills 790.

Ranking component 720 may include one or more statistical machine learning models effective to rank the candidates included in candidate pairs 715. In order to rank the candidate pairs 715, ranking component 720 may generate confidence scores for each corresponding candidate pairs 715. A confidence score may indicate that the corresponding skill 790 and/or intent of the candidate pair is appropriate to process the request. Ranking component 720 may compute features using the candidate pairs 715 and signal 717 in order to predict the ranking of the skills 790 included in the candidate pairs 715. The features computing during processing of the input data (sometimes referred to as "runtime features") may comprise a feature representation of the list of candidate pairs 715 and/or a representation of the signal 717. Additionally, ranking component 720 may query ranking and arbitration component 740 for precomputed features that have been defined for use by ranking component 720. As previously described, the precomputed features may be determined based on contextual data, user feedback data, past usage data, skill data, previous rankings of ranking component 720, etc. Additionally, ranking component 720 may compute runtime features using context data 742, user feedback data from feedback storage 743, and/or other data sources. In various examples, the loss function for the machine learning models of ranking component 720 may optimize based on user satisfaction scores computed using user feedback data from feedback storage 743.

Ranking component 720 may generate a ranked list 718 of the candidate skills indicated in candidate pairs 715. In at least some examples, the ranking component 720 may use a deep neural network as a machine learning model for determining the ranked list 718. In some examples, ranking component 720 (and/or some other speech processing system 700 component, such as decider engine 732) may determine plan data that may override the ranked list 718 such that a lower ranked skill among the candidate pairs 715 may be selected for processing the input data.

In another example, the decider engine 732 may store policies that may control whether or not explicit user feedback is solicited (e.g., via TTS) after the completion of an action (e.g., by the top-ranked skill determined by the ranker component). Explicit feedback may be solicited through the dialog speechlet 752 prior to routing input data to a skill for processing. In another example, decider engine 732 may control feedback component 797 to request explicit feedback from a user post-skill processing (e.g., via TTS). In various examples, feedback component 797 may ask the user whether or not the user was satisfied with the action taken by the speech processing system 700. In yet another example, an exploration policy defining a dynamic routing adjustment may send input data that matches predicate data defined using the dynamic routing adjustment component to a newly-implemented skill 790. The decider engine 732 may determine that the top ranked result from the ranking component 720 should be ignored due to the dynamic routing adjustment being performed by the dynamic routing adjustment component. Additionally, in some examples, a policy of the decider engine 732 may be to solicit explicit feedback from the user whenever a new skill is routed to due to a dynamic routing adjustment. Accordingly, at the completion of the action, the decider engine 732 may control TTS to inquire as to whether the user was satisfied with the interaction with the new skill and/or whether the performed action was the action intended by the user.

Decider engine 732 may output plan data that comprises a routing plan 734 for processing the input data. The routing plan 734 may define a target skill 790 to process the input data. As described above, the target skill 790 may be selected as the top-ranked hypothesis determined by the ranking component 720. In some other examples, the decider engine 732 may select a target skill 790 based on a policy, as described above. In some examples, the ranking component 720 may determine that two different skills are equally applicable for processing the input data. In such examples, the decider engine 732 may determine that disambiguation should occur. Accordingly, the routing plan 734 may include sending the input data to a dialog speechlet 752 that may output (via TTS) one or more questions (e.g., a disambiguation request) used to prompt the user to disambiguate between the two equally likely (or approximately equally likely) interpretations of the input data. For example, it may be unclear, based on a user's request, whether the user intended to invoke a movie playback skill or a music playback skill, as a movie and a soundtrack for the movie may be identified using the same name. Accordingly, the decider engine 732 may determine that the top two hypotheses of ranking component 720 are equally likely (or approximately equally likely) and may determine that a question should be asked to disambiguate between the two possible actions. Accordingly, the routing plan 734 may route the input data to the dialog speechlet 752, and the dialog speechlet 752 may inquire whether the user intended to play the movie or the soundtrack.

In another example, the decider engine 732 may determine that the user was not satisfied with the top hypothesis of the ranking component 720 (e.g., due to explicit or implicit feedback received from the user in response to taking an action associated with the top ranking component 720 hypothesis). Accordingly, the decider engine 732 may determine that the routing plan 734 should be to determine the second highest ranked hypothesis of the ranking component 720. The routing plan 734 may be sent to the fallback engine 736. In various examples, the fallback engine 736 may determine a list of the top hypotheses, top intents, and/or top ASR text interpretations from the previous turn of dialog, and may select a fallback option for processing the input data from the lists.

If a skill 790 outputs natural language text in response to processing, the orchestrator may send the text to TTS component 736 for output as audio representing the speech. Conversely, if the skill 790 (and/or the question and answer component 761) outputs a structured data representation (e.g., a meaning representation such as triple data) representing the response to the current input data, the data-to-text language model 130 and/or the semantic fidelity classifier 110 may be used to generate natural language output text representing the structured data. TTS component 736 may thereafter output audio representing the natural language output text.

Figure 8:
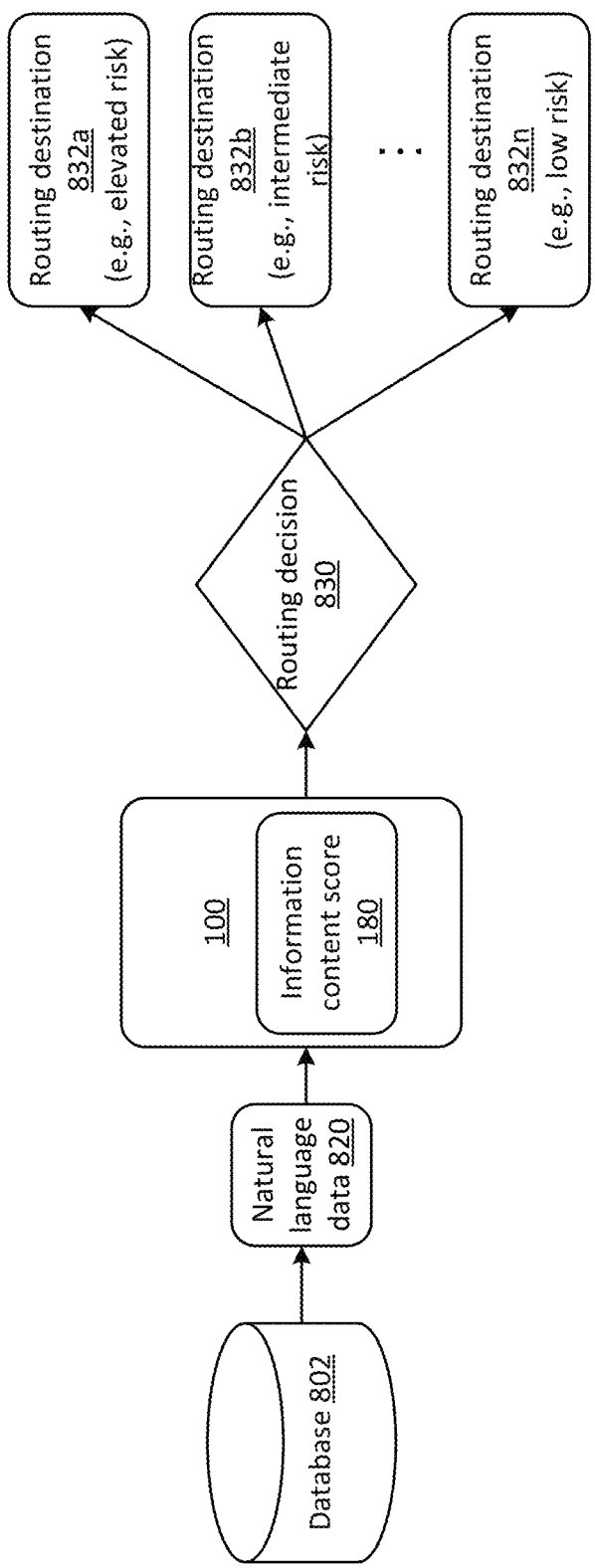
FIG. 8 is a block diagram illustrating an example in which an information content score is used to make a routing decision for natural language data, in accordance with various embodiments of the present disclosure.

FIG. 8 is a block diagram illustrating an example in which an information content score is used to make a routing decision for natural language data, in accordance with various embodiments of the present disclosure. In various examples, natural language data (e.g., natural language data 820 which may be a natural language input to a speech processing and/or a natural language processing system) may be stored in a database 802. Database 802 may be, for example, feedback storage 743. In such a case, the natural language data 820 may be user feedback concerning a particular user experience and/or interaction with the natural language processing system 700 and/or a skill 790. In another example, database 802 may be skill data 756 (e.g., natural language data received from a user in association with the operation of a particular skill 790). In other examples, the natural language data 820 may be intent data, context data, etc., stored in various components described above in reference to FIG. 7.

As previously described, system 100 may determine an information content score 180 for the natural language data 820. The information content score 180 may represent a uniqueness of various terms used in the natural language data 820 and may thus be used to identify potentially sensitive information based on the uniqueness of the natural language data. For example, if the natural language data 820 includes a word and/or combination of words that tends to be unique to a particular user and/or subset of users, the natural language data 820 may be associated with a relatively high information content score 180.

The information content score 180 may be used to make a routing decision 830 for the natural language data 820. Although routing decisions are described in detail below, other decisions concerning the natural language data 820 may be made on the basis of the information content score 180. For example, a determination of whether or not natural language data 820 may be sent to a particular destination, a determination of whether or not natural language data 820 is to be permitted to be used for a particular purpose (e.g., for advertising, for metadata describing an account, etc.), a determination of whether or not it is permissible to store the natural language data 820 in memory, etc., may be made on the basis of the information content score 180 of the natural language data 820.

In the example depicted in FIG. 8, a hierarchical routing decision is made at routing decision step 830 on the basis of the information content score 180. For example, if the natural language data 820 is associated with an elevated risk (e.g., natural language data that includes personally identifiable data, etc.), the natural language data 820 may be sent to a routing destination 832a that is associated with natural language data that is considered high risk. For example, routing destination 832a may have increased security measures (e.g., enhanced encryption, etc.) and/or more stringent access privileges relative to some other routing destinations. In various examples, the decision to route natural language data 820 to routing destination 832a may be made based on the information content score 180 exceeding a threshold associated with the routing destination 832a.

In another example, natural language data 820 may be routed to routing destination 832b when the information content score 180 indicates intermediate risk (e.g., by comparing the information content score 180 to an intermediate risk threshold). Routing destination 832b may include lower security standards relative to routing destination 832a. In an example, routing destination 832b may be a destination maintained by a third party according to security-based service level agreements. Accordingly, the routing destination 832b may be more secure relative to some routing destinations, but may be less secure (or may be potentially less secure than routing destination 832a).

In another example, natural language data 820 may be routed to routing destination 832n when the information content score 180 indicates low risk (e.g., by comparing the information content score 180 to an intermediate risk threshold). In such an example, the natural language data 820 may be sent to a potentially insecure destination since there is little-to-no information beyond generic natural language data included in the natural language data 820. In other words, the information content score 180 indicates that no sensitive information can be gleaned from the natural language data 820. Accordingly, it may be safe to send the natural language data 820 to a destination that does not have as high of security standards as routing destinations 832a, 832b.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving a tree data structure comprising a plurality of nodes, wherein a first node represents a first word included in at least one previous query, wherein the first node is associated with a first count value representing a number of times that word has been used in a dataset of queries;
   receiving a natural language input from a user;
   determining a first segment of the natural language input comprising the first word;
   determining a second segment of the natural language input comprising a second word, wherein the second word is not represented by any node of the tree data structure;
   determining a first probability for the first word, wherein the first probability is determined by dividing the first count value by a sum of count values of nodes of the tree data structure that are at the same level as the first word;
   determining a first information content score by determining a negative logarithm of the first probability;
   determining a second probability for the second word, wherein the second probability is determined by dividing the number 1 by the sum of count values of the other nodes of the tree data structure that are at the same level as the first word;
   determining a second information content score by determining the negative logarithm of the second probability;
   determining a total information content score of the natural language input using the first information content score and the second information content score;
   comparing the total information content score of the natural language input to a threshold information content score; and
   preventing the natural language input from being sent to a remote computing device.

2. The method of claim 1, further comprising:
   determining a number of words in the first segment;
   determining a negative logarithm of an inverse of the sum of count values of the other nodes of the tree data structure that are at the same level as the first word;
   determining a normalizer value by multiplying the number of words in the first segment by the negative logarithm of the inverse of the sum of count values of the other nodes of the tree data structure that are at the same level as the first word; and
   determining a normalized first information content score by dividing the first information content score by the normalizer value, wherein the total information content score of the natural language input is determined using the normalized first information content score.

3. The method of claim 1, further comprising:
   determining a first number of words in the first segment;
   determining a second number of words in the second segment;
   determining a total number of words in the natural language input;
   determining a first proportion of words in the first segment by dividing the first number of words by the total number of words;
   determining a second proportion of words in the second segment by dividing the second number of words by the total number of words; and
   determining the total information content score by adding a first product of the first information content score and the first proportion of words in the first segment to a second product of the second information content score and the second proportion of words in the second segment.

4. A method comprising:
   receiving input data representing a natural language input;
   determining first data representing a first probability of the natural language input by comparing words of the natural language input to a first data structure representing a plurality of natural language phrases;
determining second data representing a score for the natural language input based at least in part on the first data, wherein the score represents an amount of information content included in the natural language input; and
sending the input data to a remote computing device based at least in part on the second data.

5. The method of claim 4, further comprising:
determining a first value for a first word of the natural language input stored in the first data structure, wherein the first value represents a number of times the first word is used in the plurality of natural language phrases represented by the first data structure;
determining third data representing a first probability of the first word being used in the natural language input based at least in part on the first value; and
determining the second data based at least in part on the third data.

6. The method of claim 5, further comprising:
determining a second word of the natural language input;
determining fourth data representing a second probability of the second word being used in the natural language input, wherein the second probability of the second word being used is conditioned on the first probability of the first word being used; and
determining the second data further based at least in part on the fourth data.

7. The method of claim 4, wherein the first data structure is a tree data structure comprising nodes, the method further comprising:
determining a word of the natural language input;
determining that the word of the natural language input does not correspond to any words represented in the first data structure;
selecting a value for the word, wherein the value is selected for words not represented by the first data structure;
determining third data representing a probability of the word being used in the natural language input by dividing the value by a sum of values associated with nodes of the tree data structure that are connected to a root node of the tree data structure; and
determining the second data further based at least in part on the third data.

8. The method of claim 4, further comprising determining the second data based at least in part on determining a negative logarithm of the first probability of the natural language input.

9. The method of claim 4, further comprising:
determining a first segment of the natural language input that is represented in the first data structure;
determining a second segment of the natural language input that is at least partially absent from the first data structure;
determining third data representing a first score for the first segment;
determining fourth data representing a second score for the second segment; and
determining the second data based at least in part on adding the first score and the second score.

10. The method of claim 9, further comprising:
determining a number of words in the first segment;
determining fifth data representing a value N, wherein N represents a sum of counts of nodes connected to a root node of the first data structure;
determining $-\log(1/N)$;
determining a normalizer value for the first segment by multiplying the number of words in the first segment by $-\log(1/N)$; and
determining sixth data representing a normalized score for the first segment by dividing the first score by the normalizer value, wherein the second data is determined based at least in part on the sixth data.

11. The method of claim 9, further comprising:
determining fifth data representing a number of words in the first segment;
determining sixth data representing a total number of words in the natural language input;
determining seventh data representing a proportion of words in the first segment by dividing the number of words by the total number of words; and
determining eighth data representing a weighted score for the first segment by multiplying the first score by the proportion of words in the first segment, wherein the second data is determined based at least in part on the eighth data.

12. The method of claim 4, further comprising encrypting the input data based at least in part on the second data.

13. A system comprising:
at least one processor; and
at least one non-transitory computer-readable memory storing instructions that, when executed by the at least one processor, are effective to program the at least one processor to:
receive input data representing a natural language input;
determine first data representing a first probability of the natural language input by comparing words of the natural language input to a first data structure representing a plurality of natural language phrases;
determine second data representing a score for the natural language input based at least in part on the first data, wherein the score represents an amount of information content included in the natural language input; and
send the input data to a remote computing device based at least in part on the second data.

14. The system of claim 13, the at least one non-transitory computer-readable memory storing further instructions that, when executed by the at least one processor, are further effective to program the at least one processor to:
determine a first value for a first word of the natural language input stored in the first data structure, wherein the first value represents a number of times the first word is used in the plurality of natural language phrases represented by the first data structure;
determine third data representing a first probability of the first word being used in the natural language input based at least in part on the first value; and
determine the second data based at least in part on the third data.

15. The system of claim 14, the at least one non-transitory computer-readable memory storing further instructions that, when executed by the at least one processor, are further effective to program the at least one processor to:
determine a second word of the natural language input;
determine fourth data representing a second probability of the second word being used in the natural language input, wherein the second probability of the second word being used is conditioned on the first probability of the first word being used; and determine the second data further based at least in part on the fourth data.

16. The system of claim 13, wherein the first data structure is a tree data structure comprising nodes, the at least one non-transitory computer-readable memory storing further instructions that, when executed by the at least one processor, are further effective to program the at least one processor to:
determine a word of the natural language input;
determine that the word of the natural language input does not correspond to any words represented in the tree data structure;
select a value for the word, wherein the value is selected for words not represented by the tree data structure;
determine third data representing a probability of the word being used in the natural language input by dividing the value by a sum of values associated with nodes of the first data structure that are connected to a root node of the tree data structure; and
determine the second further based at least in part on the third data.

17. The system of claim 13, the at least one non-transitory computer-readable memory storing further instructions that, when executed by the at least one processor, are further effective to program the at least one processor to determine the second data based at least in part on determining a negative logarithm of the first probability of the natural language input.

18. The system of claim 13, the at least one non-transitory computer-readable memory storing further instructions that, when executed by the at least one processor, are further effective to program the at least one processor to:
determine a first segment of the natural language input that is represented in the first data structure;
determine a second segment of the natural language input that is at least partially absent from the first data structure;
determine third data representing a first score for the first segment;
determine fourth data representing a second score for the second segment; and
determine the second data based at least in part on adding the first score and the second score.

19. The system of claim 18, the at least one non-transitory computer-readable memory storing further instructions that, when executed by the at least one processor, are further effective to program the at least one processor to:
determine a number of words in the first segment;
determine fifth data representing a value N, wherein N represents a sum of counts of nodes connected to a root node of the first data structure;
determine $-\log(1/N)$;
determine a normalizer value for the first segment by multiplying the number of words in the first segment by $-\log(1/N)$; and
determine sixth data representing a normalized score for the first segment by dividing the first score by the normalizer value, wherein the second data is determined based at least in part on the sixth data.

20. The system of claim 18, the at least one non-transitory computer-readable memory storing further instructions that, when executed by the at least one processor, are further effective to program the at least one processor to:
store the input data in the at least one non-transitory computer-readable memory based at least in part on the second data.

* * * * *